United States Patent [19]
Minor et al.

[11] Patent Number: 5,409,254
[45] Date of Patent: Apr. 25, 1995

[54] REAR SUSPENSION WITH ALIGNED COIL SPRINGS AND TWIST BEAM AXLE

[75] Inventors: Thomas O. Minor, Scottsdale, Ariz.; Stephen L. Kretschmer, Mequon, Wis.; Michael J. Erickson, Howell, Mich.

[73] Assignee: A. O. Smith Corporation, Milwaukee, Wis.

[21] Appl. No.: 162,806

[22] Filed: Dec. 3, 1993

Related U.S. Application Data

[63] Continuation of Ser. No. 881,477, May 11, 1992, abandoned.

[51] Int. Cl.$^6$ .............................................. B60G 11/50
[52] U.S. Cl. ................................... 280/665; 267/190; 280/689; 280/697; 280/717; 280/722; 280/726
[58] Field of Search ................ 280/697, 700, 701, 715, 280/665, 662, 664, 688, 689, 724, 721, 722, 723, 726, 725, 717; 267/190

[56] References Cited

U.S. PATENT DOCUMENTS

| | | | |
|---|---|---|---|
| 3,333,653 | 8/1967 | Eirhart, Jr. | 180/73 |
| 3,692,295 | 9/1972 | Cass et al. | 267/57 |
| 4,054,303 | 10/1977 | deKruyff | 280/689 |
| 4,093,273 | 6/1978 | Fitzpatrick et al. | 280/696 |
| 4,153,131 | 5/1979 | Sakata et al. | 180/42 |
| 4,165,098 | 8/1979 | Wagner | 280/708 |
| 4,281,850 | 8/1981 | Studer | 280/689 |
| 4,418,932 | 12/1983 | Claar | 280/660 |
| 4,429,900 | 2/1984 | Feher | 280/689 |
| 4,432,564 | 2/1984 | Tronville | 280/689 |
| 4,486,030 | 12/1984 | Takata et al. | 280/689 |
| 4,544,180 | 10/1985 | Maru et al. | 280/689 |
| 4,591,184 | 5/1986 | Matschinsky | 280/666 |
| 4,633,564 | 1/1987 | Gauber | 280/689 |
| 4,635,958 | 1/1987 | Yonemoto | 280/664 |
| 4,637,628 | 1/1987 | Perkins | 280/689 |
| 4,750,757 | 6/1988 | Long | 280/689 |
| 4,772,042 | 9/1988 | Jinsheng | 280/669 |
| 4,799,703 | 1/1989 | Mueller et al. | 280/91 |
| 4,815,762 | 3/1989 | Jurr | 280/91 |
| 4,830,396 | 5/1989 | Gandiglio | 280/701 |

FOREIGN PATENT DOCUMENTS

| | | | |
|---|---|---|---|
| 928813 | 6/1955 | Germany | 267/190 |
| 2220119 | 10/1985 | Germany | |
| 57-84210 | 5/1982 | Japan | |
| 57-87707 | 6/1982 | Japan | |
| 58-53504 | 3/1983 | Japan | |
| 2145797 | 4/1985 | United Kingdom | |

OTHER PUBLICATIONS

Affidavit of Stephen L. Kretschmer.
Exhibit A—Letter of Jan. 15, 1990 from Paul T. Barnes.
Exhibit B—Letter of Jun. 15, 1990 from Kelly W. Ronayne.
Exhibit C—Letter of Jul. 6, 1990 from Paul T. Barnes.
Exhibit D—Letter of Apr. 12, 1991 from John R. Engebretson.
Popular Science, Sep. 1990, p. 29.

*Primary Examiner*—Eric D. Culbreth
*Attorney, Agent, or Firm*—Michael E. Taken; David R. Price

[57] ABSTRACT

In a front wheel drive vehicle, a rear suspension system is provided for non-driven non-steered rear wheels. A twist beam axle extends along a transverse horizontal line between the rear wheels, and a pair of coil springs extend along respective spaced parallel axes intersecting the noted transverse horizontal line. A stabilizer torsion bar extends along the transverse horizontal line of the twist beam axle. Each spring seat assembly is attached between its respective wheel spindle mounting plate and the twist beam axle such that the wheel spindle mounting plate is spaced outwardly of the twist beam axle. The stabilizer torsion bar extends between the spring seat assemblies and is attached to each at a point spaced inwardly of the respective wheel spindle mounting plate and inboard of the respective coil spring. Upper and lower mating shell structure is provided for the spring seat assemblies, including an upper surface with an opening therein through which the respective coil spring extends. The mating shells have overlapped surfaces providing sections of increased thickness stock. Fishmouth brackets strengthen the joint between the spring seat assembly and the twist beam axle, and reinforcing brackets have weldments aligned with fishmouth bracket weldments, providing additional stiffness along fatigue areas.

12 Claims, 5 Drawing Sheets

REAR SUSPENSION WITH ALIGNED COIL SPRINGS AND TWIST BEAM AXLE

This is a continuation of Ser. No. 881,477, filed May 11, 1992, now abandoned.

FIELD OF THE INVENTION

The invention relates to a rear suspension system for non-driven non-steered rear wheels of a front wheel drive vehicle.

BACKGROUND

In the noted suspension system, it is preferred that coil springs be provided on the rear wheel centerline for a smoother ride and also to allow a lower spring rate. The typical vehicle configuration dictates that the spring seat be as low as possible consistent with adequate ground clearance. A twist beam axle requires a structural element between the wheel spindle attachments which is designed to resist bending but be able to twist along its longitudinal axis. To satisfy vehicle dynamic requirements, previous designs have located the twist beam axle either ahead of or behind the coil springs. This was necessary in order to keep the lower spring seat as low as possible. With the twist beam ahead of the coil springs, the springs can be located on the wheel centerline; however, the twist beam axle will occupy a location which typically interferes with the fuel tank. With the twist beam axle behind the coil springs, previous designs moved such springs ahead of the rear wheel centerline, necessitating a higher spring rate. Keeping the coil springs on the wheel centerline and having the twist beam axle behind the coil springs puts the beam in a location where it may interfere with the preferred spare tire stowage area.

SUMMARY

In one aspect of the present invention, a construction is provided enabling the coil springs to extend along respective spaced parallel axes intersecting the transverse horizontal line along which the twist beam axle extends. In the preferred embodiment, the invention allows location of both the twist beam axle and the coil springs on the rear wheel centerline, without compromising the desired lower spring seat height.

In another aspect, the noted desirable orientation is accomplished by enlarging the twist beam axle structure near the spring location, allowing each respective coil spring to pass through an opening in the top surface of the structure, and providing a respective spring mounting surface on the bottom of the structure.

The noted arrangement may cause problems in the attachment of a stabilizer torsion bar which is generally needed to allow adjusting of the torsional stiffness of the structure to meet vehicle handling requirements. The stabilizer bar is usually anchored to the rear wheel spindle mounting plates, which are ordinarily of sufficient thickness to allow for adequate distribution of the torsional loads. With the coil springs and the twist beam axle on the rear wheel centerline, attachment of the stabilizer torsion bar to the rear wheel spindle mounting plates would require costly forming in order to avoid interfering with the spring. The present invention provides an overlap of a two piece outer portion of the twist beam axle structure in a location which allows rigid attachment of a straight stabilizer torsion bar inboard of the spring location. The overlap also allows for adequate distribution of the stabilizer torsion bar loads.

In another aspect, reinforcing brackets have attachment weldments aligned with attachment weldments of fishmouth brackets, providing additional stiffness along fatigue areas, to extend life.

BRIEF DESCRIPTION OF THE DRAWINGS

FIG. 3 is a side view of a portion of the structure of FIG. 1, taken along line 3—3 of FIG. 5.

DETAILED DESCRIPTION

Figure 1:
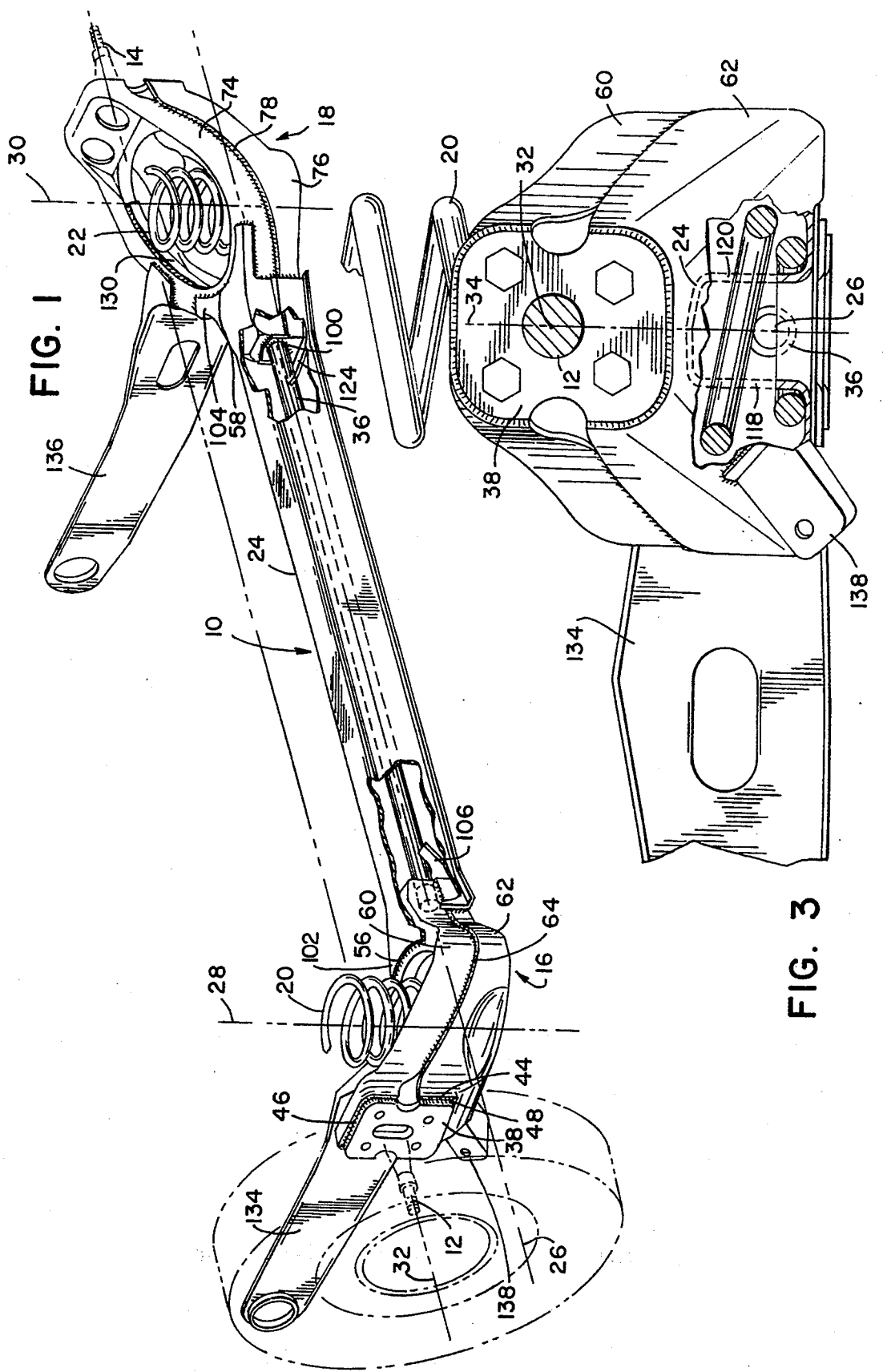
FIG. 1 is a perspective view of a rear suspension system in accordance with the invention.

FIG. 1 shows a rear suspension system 10 for non-driven non-steered rear wheels of a front wheel drive vehicle. The rear suspension system includes a pair of rear wheel spindles 12, 14, a pair of spring seat assemblies 16, 18, each attached to a respective one of the wheel spindles and seating a respective coil spring 20, 22, and a twist beam axle 24 extending along a transverse horizontal line 26 between and rigidly attached to spring seat assemblies 16, 18. Coil springs 20, 22 extend along respective spaced parallel vertical axes 28, 30 intersecting transverse horizontal line 26. Wheel spindles 12, 14 extend along a common centerline 32. Axes 28, 30 also intersect centerline 32. Transverse horizontal line 26 and centerline 32 are parallel and lie in the same vertical plane 34, FIG. 3, which plane is defined by axes 28, 30. Stabilizer torsion bar 36 extends along transverse horizontal line 26 between and is rigidly attached to spring seat assemblies 16, 18. Wheel spindles 12, 14, spring seat assemblies 16, 18, coil springs 20, 22, twist beam axle 24, transverse horizontal line 26, axes 28, 30, centerline 32, and stabilizer torsion bar 36 all lie in the same vertical plane 34.

Figure 5:
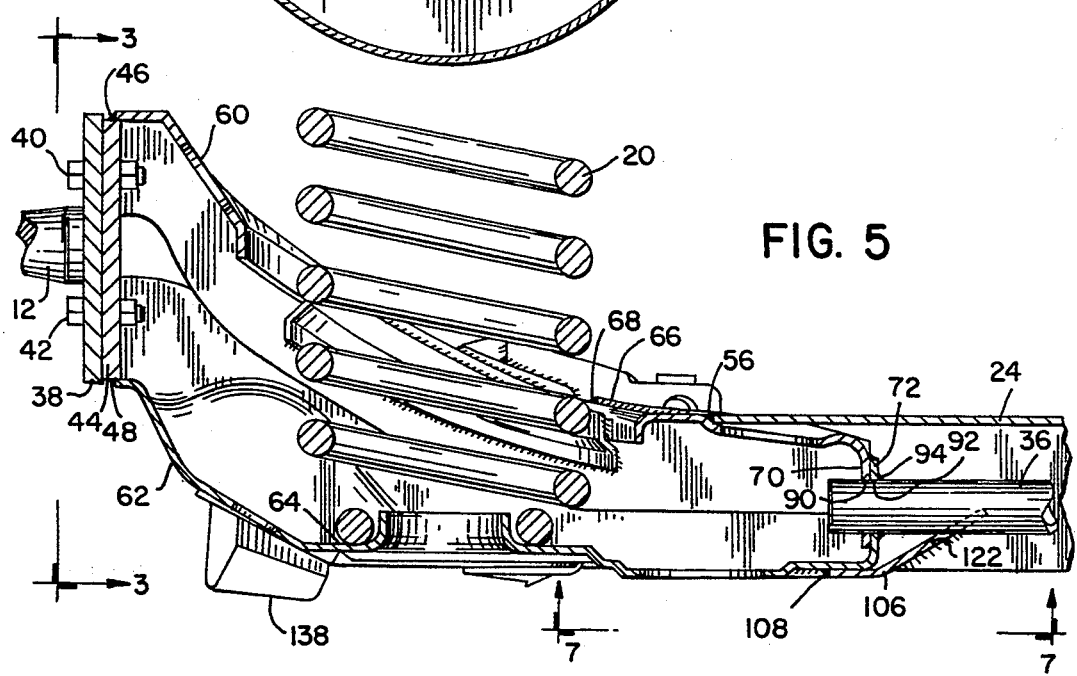
FIG. 5 is a side view partially in section of a portion of the structure of FIG. 1.
Figure 6:
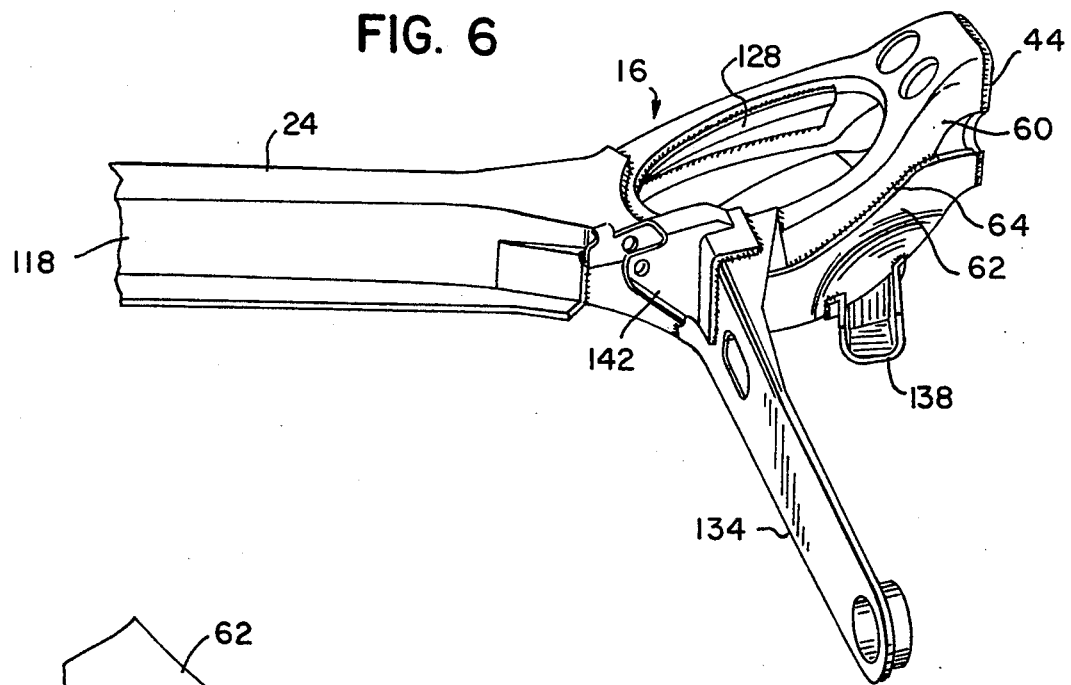
FIG. 6 is a perspective view of a portion of the structure of FIG. 1.
Figure 8:
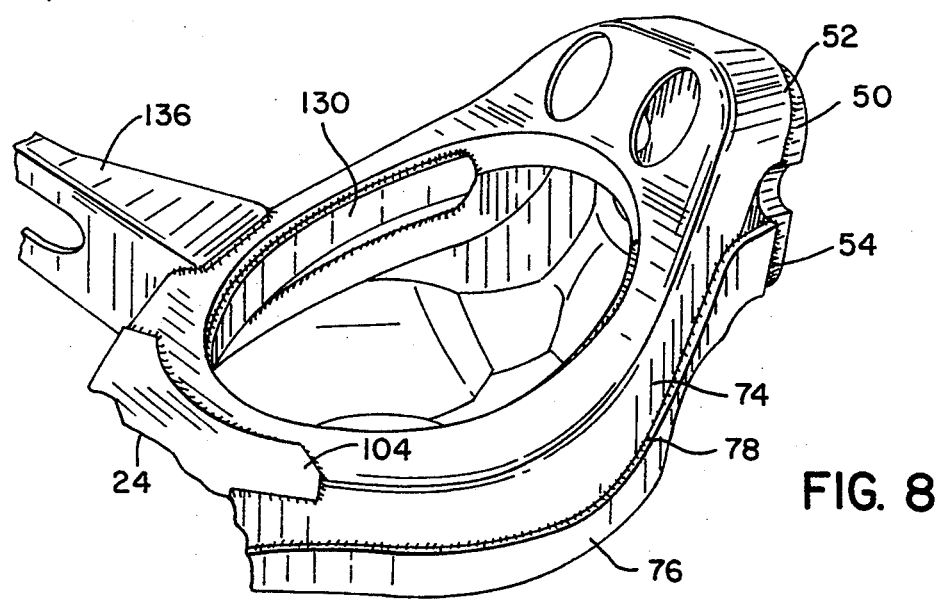
FIG. 8 is a perspective view of a portion of the structure of FIG. 1.

Left wheel spindle 12 has a base flange 38 bolted at bolts such as 40, 42, FIG. 5, to mounting plate 44 which is welded at weldments 46, 48 to spring seat assembly 16. Right wheel spindle 14 is comparable, and has a base flange (not shown) bolted to mounting plate 50, FIGS. 2 and 8, which is welded at weldments 52, 54 to spring seat assembly 18. Twist beam axle 24 is welded at weldments 56 and 58 to spring seat assemblies 16 and 18. Each spring seat assembly 16, 18 is attached between its respective wheel spindle mounting plate 44, 50 and twist beam axle 24, such that each wheel spindle mounting plate 44, 50 is spaced outwardly of twist beam axle 24 by the respective spring seat assembly 16, 18 therebetween.

Figure 2:
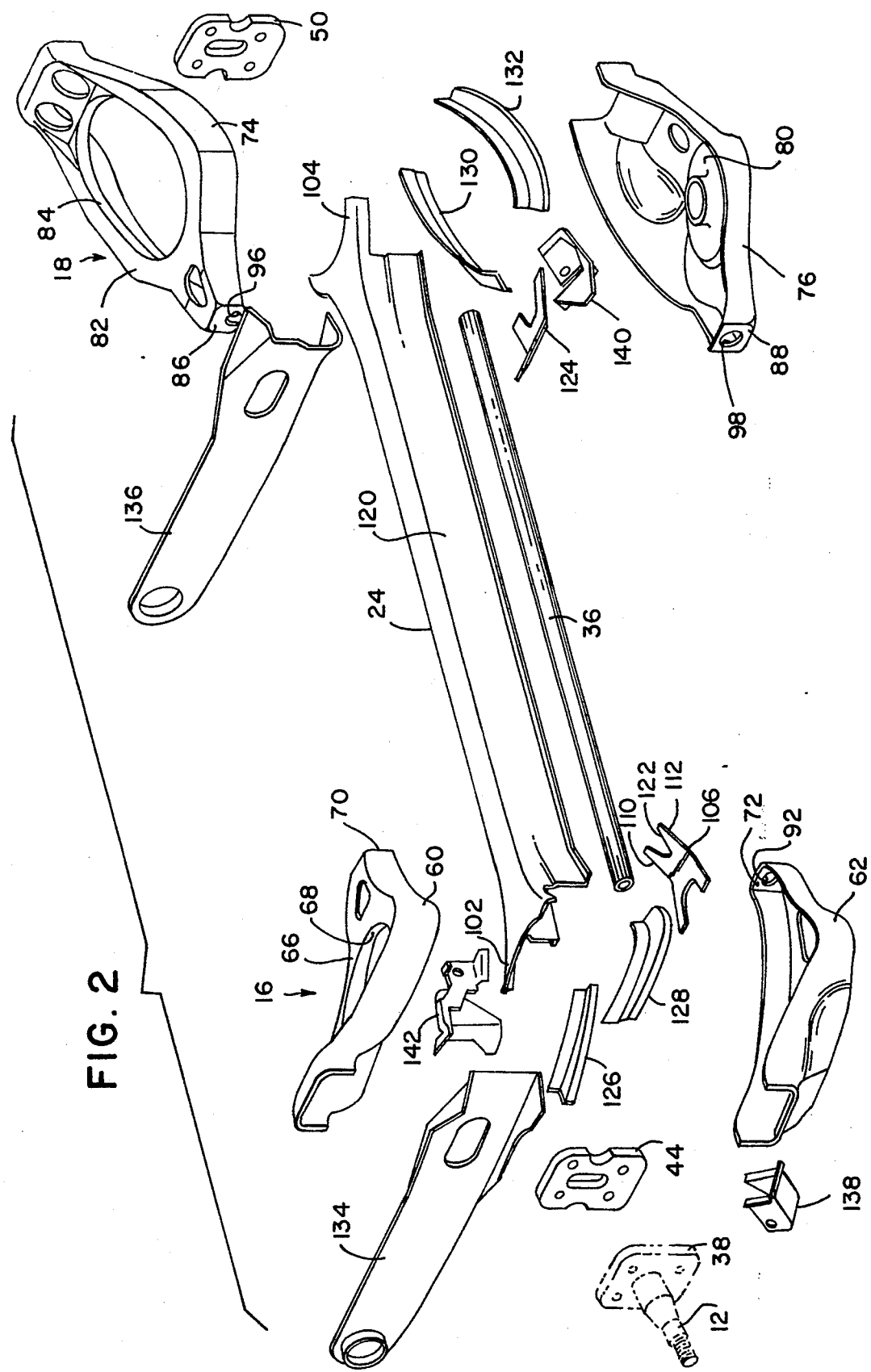
FIG. 2 is an exploded perspective view of the structure of FIG. 1.
Figure 4:
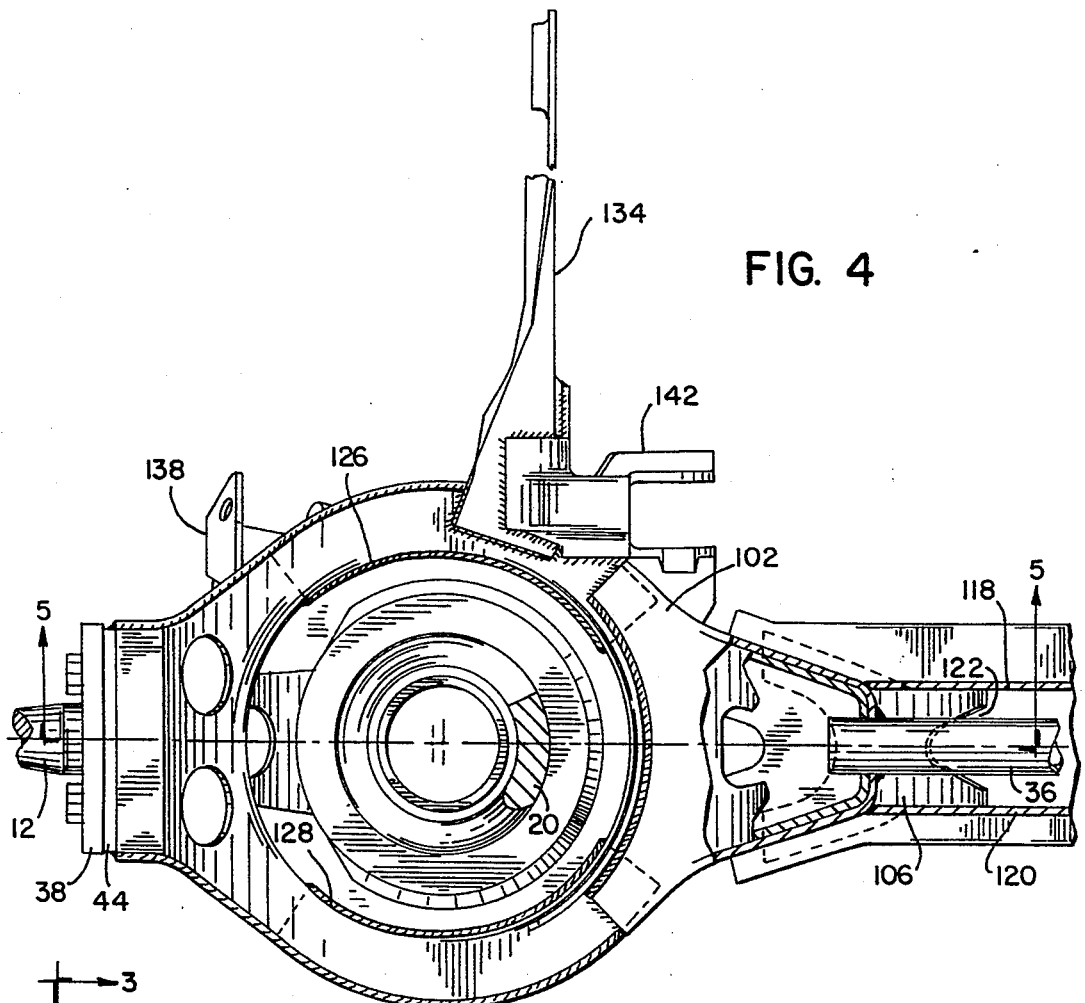
FIG. 4 is a top view partially in section of a portion of the structure of FIG. 1.

Spring seat assembly 16 is formed by upper and lower mating shells 60 and 62, FIG. 2, welded to each other at weldment 64, FIG. 1. Lower shell 62 has a lower spring seating surface 64, FIG. 5, and upper shell 60 has an upper surface 66 with an opening 68 therein through which coil spring 20 extends upwardly from lower spring seating surface 64. Upper and lower mating shells 60 and 62 are overlapped at inboard side sections 70 and 72, FIGS. 2 and 5, to provide a combined section of increased thickness stock. Right spring seat assembly 18 is comparable, and is formed by upper and lower mating shells 74 and 76 welded to each other at weldment 78. Lower shell 76 has a spring seating surface 80, FIG. 2, and upper shell 74 has an upper surface 82 with an opening 84 therein through which coil spring 22 extends upwardly from lower spring seating surface 80. Upper and lower mating shells 74 and 76 have overlapped inboard side sections 86 and 88 providing a combined section of increased thickness stock.

Twist beam axle 24 has an inverted U-shape in cross section, FIG. 3, and receives stabilizer torsion bar 36 within the downwardly opening U. Torsion bar 36 extends between spring seat assemblies 16 and 18 and has a left end extending through apertures 90 and 92, FIG. 5, in respective inboard side sections 70 and 72 of upper and lower mating shells 60 and 62 and welded thereto at weldment 94. Torsion bar 36 has a right end extending through apertures 96 and 98, FIG. 2, in respective inboard side sections 86 and 88 of upper and lower shells 74 and 76 and welded thereto at weldment 100, FIG. 1. Stabilizer torsion bar 36 extends between spring seat assemblies 16, 18 and is attached to each at respective weldments 94, 100 at a point spaced inwardly of the respective wheel spindle mounting plate 44, 50. The attachment point 44, 50 of the stabilizer torsion bar 36 to the respective spring seat assembly 16, 18 is inboard of the respective coil spring 20, 22. The attachment point of stabilizer torsion bar 36 to the respective spring seat assembly 16, 18 is at the noted respective section of increased thickness stock 70, 72 and 86, 88.

Figure 7:
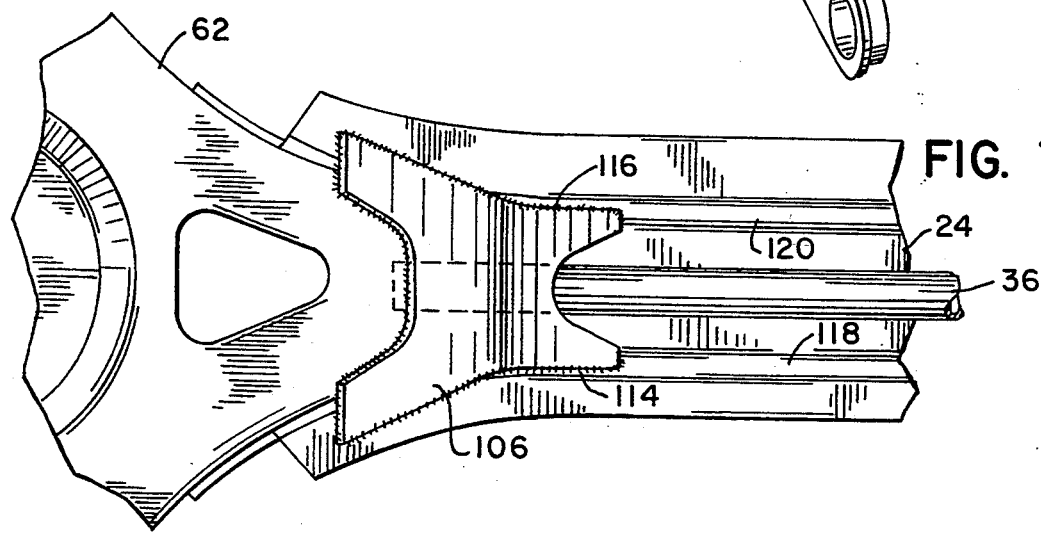
FIG. 7 is a bottom view of a portion of the structure of FIG. 1, taken along line 7—7 of FIG. 5.

Twist beam axle 24 has enlarged flared ends 102 and 104 mating with and extending partially around the spring seat assemblies at the noted openings 68, 84, for stress distribution. Left fishmouth bracket 106, FIG. 2, has a left end welded at weldment 108, FIG. 5, to the underside of lower shell 62. The right portion of bracket 106 has forward and rearward upwardly angled side edges 110, 112 each of which is welded at respective weldment 114, 116, FIG. 7, to a respective forward and rearward downwardly extending side 118, 120 of inverted U-shaped twist beam axle 24. This provides further stress distribution and strengthening of the junction of twist beam axle 24 to spring seat assembly 16. The right portion of bracket 106 has a V-shaped notch 122 allowing clearance of torsion bar 36 therethrough. Right fishmouth bracket 124 is comparable. Upper shell 60 of spring seat assembly 16 is reinforced at opening 68 by collars 126, 128 welded thereto. Upper shell 74 of spring seat assembly 18 is reinforced at opening 84 by collars 130, 132 welded thereto. Trailing link arms 134, 136 have forward ends for connection to the vehicle, and rearward ends welded to respective spring seat assemblies 16, 18. Shock absorber brackets 138, 140 are welded to respective spring seat assemblies 16, 18. Track bar bracket 142 is welded to spring seat assembly 16 and trailing link arm 134.

Figure 9:
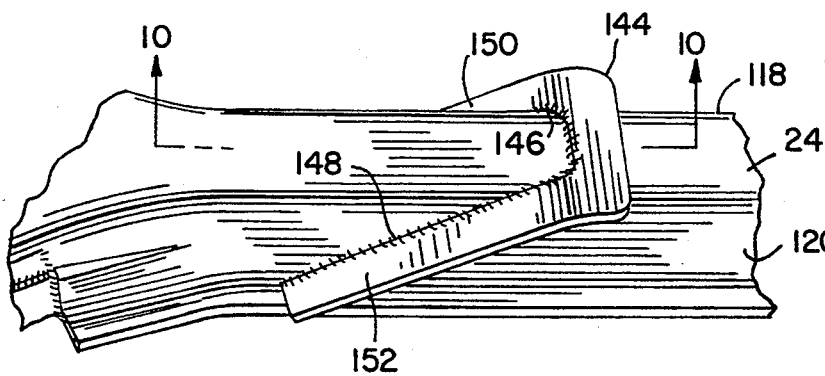
FIG. 9 is a perspective view of a portion of the structure of FIG. 1 and shows a further embodiment.
Figure 10:
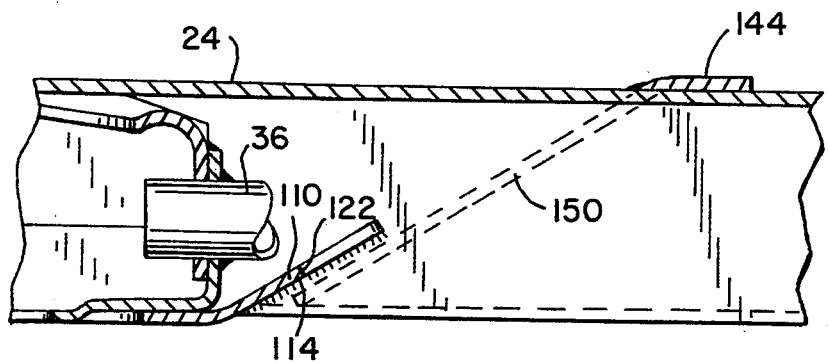
FIG. 10 is a sectional view taken along line 10—10 of FIG. 9.

In the preferred embodiment, reinforcing brackets, FIGS. 9–12, provide additional stiffness for twist beam axle 24 in the vicinity of fishmouth brackets 106 and 124. FIGS. 9 and 10 show an external reinforcement bracket 144 welded to forward and rearward downwardly extending sides 118 and 120 of inverted U-shaped twist beam axle 24 along weldments 146 and 148 aligned with forward and rearward upwardly angled side edges 110 and 112 of fishmouth bracket 106 at respective weldments 114 and 116. Fishmouth bracket 106 extends along the interior of inverted U-shaped twist beam axle 24. Reinforcing bracket 144 extends along the exterior of inverted U-shaped twist beam axle 24. Reinforcing bracket 144 is an inverted U-shaped member having forward and rearward downwardly angled sides 150 and 152 welded at respective weldments 146 and 148 to the outer surface of forward and rearward downwardly extending sides 118 and 120 of inverted U-shaped twist beam axle 24. Bracket sides 150 and 152 extend parallel to forward and rearward upwardly angled side edges 110 and 112 of fishmouth bracket 106. Weldments 146 and 148 of reinforcing bracket 144 are preferably substantially colinear with and partially overlap weldments 114 and 116 of fishmouth bracket 106 on opposite exterior and interior surfaces of forward and rearward sides 118 and 120 of twist beam axle 24. A comparable reinforcing bracket is provided at the right end of twist beam axle 24 at fishmouth bracket 124.

Figure 11:
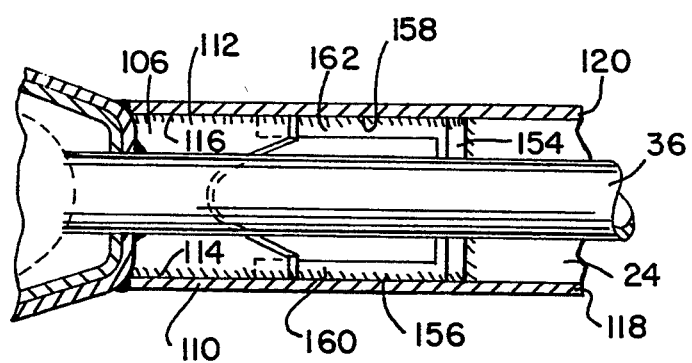
FIG. 11 is a bottom view of a portion of the structure of FIG. 1 and shows a further embodiment.
Figure 12:
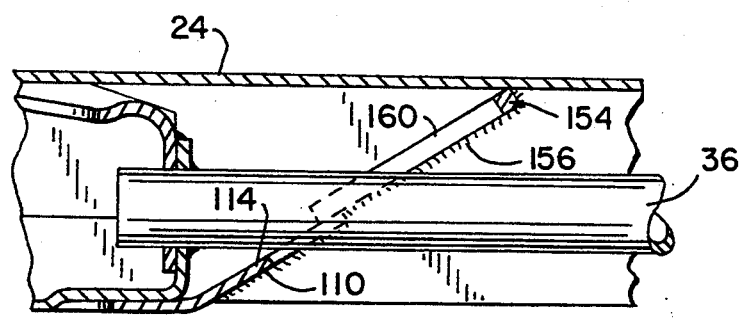
FIG. 12 is a side sectional view of the structure of FIG. 11.

FIGS. 11 and 12 show an internal reinforcing bracket 154 welded to forward and rearward downwardly extending sides 118 and 120 of inverted U-shaped twist beam axle 24 along weldments 156 and 158 aligned with forward and rearward upwardly angled side edges 110 and 112 of fishmouth bracket 106. Reinforcing bracket 154 extends along the interior of inverted U-shaped twist beam axle 24. Reinforcing bracket 154 is an inverted U-shaped member having forward and rearward downwardly angled sides 160 and 162 welded at respective weldments 156 and 158 to the inner surface of forward and rearward downwardly extending sides 118 and 120 of inverted U-shaped twist beam axle 24 and extending parallel to forward and rearward upwardly angled side edges 110 and 112 of fishmouth bracket 106. Weldments 156 and 158 of reinforcing bracket 154 are substantially colinear with and partially overlap respective weldments 114 and 116 of fishmouth bracket 106. In the embodiment in FIGS. 11 and 12, a comparable internal reinforcing bracket is provided at the right end of twist beam axle 24 at fishmouth bracket 124. External reinforcing brackets such as 144 or internal reinforcing brackets such as 154 are preferred for maximizing the fatigue life in the area of the fishmouth brackets.

It is recognized that various equivalents, alternatives and modifications are possible within the scope of the appended claims.

We claim:

1. In a front wheel drive vehicle, a rear suspension system for non-driven non-steered rear wheels, comprising:
   a pair of wheel spindles:
   a pair of spring seat assemblies, each attached to a respective one of the wheel spindles and seating a respective coil spring;
   a twist beam axle extending between and rigidly attached to the spring seat assemblies, wherein each said spring seat assembly has a lower spring seating surface and an upper surface with an opening therein through which the respective said coil spring extends upwardly from the lower spring seating surface, each said spring seat assembly comprising upper and lower mating shells forming said upper and lower surfaces, respectively, and overlapped along an inboard side to provide a section of increased thickness stock, and comprising a stabilizer torsion bar extending between said spring seat assemblies and attached to each at the respective said section of increased thickness stock.

2. In a front wheel drive vehicle, a rear suspension system for non-driven non-steered rear wheels, comprising:
a pair of wheel spindles extending along a common centerline;
a pair of spring seat assemblies, each attached to a respective one of said wheel spindles and seating a respective coil spring, each having a lower spring seating surface and an upper surface with an opening therein through which the respective said coil spring extends upwardly from said lower spring seating surface, and each comprising upper and lower mating shells forming said upper and lower surfaces, respectively, and overlapped along an inboard side to provide a section of increased thickness stock;
a twist beam axle extending along a transverse horizontal line between and rigidly attached to said spring seat assemblies, wherein said coil springs extend along respective spaced parallel axes intersecting said transverse horizontal line and said common centerline; and
a stabilizer torsion bar extending between said spring seat assemblies and attached to each at the respective said section of increased thickness stock.

3. In a front wheel drive vehicle, a rear suspension system for non-driven non-steered rear wheels, comprising:
a pair of wheel spindles extending along a common centerline;
a pair of spring seat assemblies, each attached to a respective one of said wheel spindles and seating a respective coil spring;
a twist beam axle extending along a transverse horizontal line between and rigidly attached to said spring seat assemblies, wherein said coil springs extend along respective spaced parallel axes intersecting said transverse horizontal line and said common centerline; and
a pair of fishmouth brackets each having a first portion rigidly attached to a respective spring seat assembly, and a second portion rigidly attached to said twist beam axle for strengthening the joint between said respective spring seat assembly and said twist beam axle.

4. The rear suspension system according to claim 3 comprising a stabilizer torsion bar extending between said spring seat assemblies along a transverse horizontal line, and wherein said second portion of each fishmouth bracket has a notched opening through which said stabilizer torsion bar extends, 5. The rear suspension system according to claim 3 wherein said twist beam axle has a generally inverted U-shape in cross section having forward and rearward downwardly extending sides, and wherein said second portion of each said fishmouth bracket has forward and rearward upwardly angled side edges welded to said forward and rearward downwardly extending sides of said inverted U-shaped twist beam axle.

6. The rear suspension system according to claim 5 comprising a reinforcing bracket welded to said forward and rearward downwardly extending sides of said inverted U-shaped twist beam axle along weldments aligned with said forward and rearward upwardly angled side edges of said fishmouth bracket.

7. The rear suspension system according to claim 6 wherein said fishmouth bracket extends along the interior of said inverted U-shaped twist beam axle, and said reinforcing bracket extends along the exterior of said inverted U-shaped twist beam axle.

8. The rear suspension system according to claim 7 wherein said reinforcing bracket is an inverted U-shaped member having forward and rearward downwardly angled sides welded to the outer surface of said forward and rearward downwardly extending sides of said inverted U-shaped twist beam axle and extending parallel to said forward and rearward upwardly angled side edges of said fishmouth bracket.

9. The rear suspension system according to claim 6 wherein said fishmouth bracket extends along the interior of said inverted U-shaped twist beam axle, and said reinforcing bracket extends along the interior of said inverted U-shaped twist beam axle.

10. The rear suspension system according to claim 9 wherein said reinforcing bracket is an inverted U-shaped member having forward and rearward downwardly angled sides welded to the inner surface of said forward and rearward downwardly extending sides of said inverted U-shaped twist beam axle and extending parallel to said forward and rearward upwardly angled side edges of said fishmouth bracket.

11. The rear suspension system according to claim 5 comprising an inverted U-shaped reinforcing bracket welded to said inverted U-shaped twist beam axle along weldments substantially colinear with and partially overlapping the weldments attaching said forward and rearward upwardly angled side edges of said fishmouth bracket to said forward and rearward downwardly extending sides of said inverted U-shaped twist beam axle.

12. In a front wheel drive vehicle, a rear suspension system for non-driven non-steered rear wheels, comprising:
a pair of wheel spindles extending along a common centerline;
a pair of spring seat assemblies, each attached to a respective one of said wheel spindles and seating a respective coil spring;
a twist beam axle extending along a transverse horizontal line between and rigidly attached to said spring seat assemblies, said twist beam axle having a generally inverted U-shape in cross section having forward and rearward downwardly extending sides, wherein said coil springs extend along respective spaced parallel axes intersecting said transverse horizontal line and said common centerline;
a pair of fishmouth brackets each having a first portion rigidly attached to a respective spring seat assembly, and a second portion rigidly attached to said twist beam axle for strengthening the joint between said spring seat assembly and said twist beam axle;
a stabilizer torsion bar in said inverted U-shaped twist beam axle and extending between said spring seat assemblies along a transverse horizontal line, wherein said second portion of each fishmouth bracket has a notched opening through which said stabilizer torsion bar extends, and wherein said second portion of each said fishmouth bracket has forward and rearward upwardly angled side edges welded to said forward and rearward downwardly extending sides of said inverted U-shaped twist beam axle; and a reinforcing bracket having forward and rearward downwardly angled sides welded to said forward and rearward downwardly extending sides of said inverted U-shaped twist beam axle along weldments aligned with and partially overlapping the weldments attaching said forward and rearward upwardly angled side edges of said fishmouth bracket to said forward and rearward downwardly extending sides of said inverted U-shaped twist beam axle.

* * * * *